United States Patent
Dewan et al.

(10) Patent No.: US 10,592,435 B2
(45) Date of Patent: Mar. 17, 2020

(54) SYSTEM, APPARATUS AND METHOD FOR SECURE MONOTONIC COUNTER OPERATIONS IN A PROCESSOR

(71) Applicant: Intel Corporation, Santa Clara, CA (US)

(72) Inventors: Prashant Dewan, Hillsboro, OR (US); Siddhartha Chhabra, Hillsboro, OR (US); David M. Durham, Beaverton, OR (US); Karanvir S. Grewal, Hillsboro, OR (US); Alpa T. Narendra Trivedi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 605 days.

(21) Appl. No.: 15/209,955

(22) Filed: Jul. 14, 2016

(65) Prior Publication Data
US 2018/0018288 A1    Jan. 18, 2018

(51) Int. Cl.
*G06F 12/14* (2006.01)
*G06F 21/74* (2013.01)
(Continued)

(52) U.S. Cl.
CPC ........ *G06F 12/1416* (2013.01); *G06F 3/0622* (2013.01); *G06F 3/0637* (2013.01);
(Continued)

(58) Field of Classification Search
CPC .. G06F 12/1416; G06F 3/0622; G06F 21/602; G06F 3/0673; G06F 21/10;
(Continued)

(56) References Cited

U.S. PATENT DOCUMENTS 6,651,171 B1 * 11/2003 England .............. G06F 12/1491
                                                711/163
7,350,083 B2    3/2008 Wells et al.
(Continued)

FOREIGN PATENT DOCUMENTS

WO    2014084908    6/2014

OTHER PUBLICATIONS

International Searching Authority, "Notification of Transmittal of the International Search Report and the Written Opinion of the International Searching Authority," dated Sep. 20, 2017, in International application No. PCT/US2017/037136.
(Continued)

*Primary Examiner* — Theodore C Parsons
*Assistant Examiner* — Thomas Ho
(74) *Attorney, Agent, or Firm* — Trop, Pruner & Hu, P.C.

(57) ABSTRACT

In one embodiment, an apparatus includes: at least one core to execute instructions, the at least one core formed on a semiconductor die; a first memory formed on the semiconductor die, the first memory comprising a non-volatile random access memory, the first memory to store a first entry to be a monotonic counter, the first entry including a value field and a status field; and a control circuit, wherein the control circuit is to enable access to the first entry if the apparatus is in a secure mode and otherwise prevent the access to the first entry. Other embodiments are described and claimed.

12 Claims, 6 Drawing Sheets

(51) Int. Cl.
  *G06F 3/06* (2006.01)
  *G06F 21/10* (2013.01)
  *G06F 21/60* (2013.01)
  *G06F 21/62* (2013.01)

(52) U.S. Cl.
  CPC ............ *G06F 3/0673* (2013.01); *G06F 21/10* (2013.01); *G06F 21/602* (2013.01); *G06F 21/6218* (2013.01); *G06F 21/74* (2013.01); *G06F 2212/1052* (2013.01); *G06F 2221/2107* (2013.01)

(58) Field of Classification Search
  CPC ............... G06F 21/6218; G06F 3/0637; G06F 2212/1052; G06F 21/74; G06F 2221/2107
  See application file for complete search history.

(56) References Cited

U.S. PATENT DOCUMENTS

| | | | | |
|---|---|---|---|---|
| 8,082,450 | B2* | 12/2011 | Frey | H04L 9/3247 380/44 |
| 8,184,812 | B2* | 5/2012 | Margolis | G06F 1/263 380/221 |
| 9,087,200 | B2* | 7/2015 | McKeen | G06F 21/72 |
| 9,407,636 | B2* | 8/2016 | Scarlata | H04L 63/0876 |
| 2003/0194094 | A1* | 10/2003 | Lampson | G06F 9/4406 380/282 |
| 2006/0090084 | A1* | 4/2006 | Buer | G06F 21/53 713/189 |
| 2009/0178138 | A1* | 7/2009 | Weiss | G06F 21/577 726/22 |
| 2010/0313056 | A1* | 12/2010 | Margolis | G06F 1/263 713/500 |
| 2013/0159727 | A1* | 6/2013 | Sarangdhar | G06F 12/1408 713/189 |
| 2013/0346757 | A1* | 12/2013 | Nick | G06F 21/6245 713/189 |
| 2014/0137178 | A1* | 5/2014 | Thom | G06F 21/6218 726/1 |
| 2015/0199519 | A1 | 7/2015 | Marr et al. | |
| 2016/0259941 | A1* | 9/2016 | Vasudevan | G06F 21/575 |
| 2016/0380985 | A1* | 12/2016 | Chhabra | H04L 67/146 713/171 |

OTHER PUBLICATIONS

Nature Nanotechnology, "Memory With a Spin", www.nature.com/naturenanotechnology, Mar. 2015, 1 page, vol. 10, Macmillan Publishers Limited.

Ittai Anati, et al., "Innovative Technology for CPU Based Attestation and Sealing," 2013, 7 pages.

* cited by examiner

SYSTEM, APPARATUS AND METHOD FOR SECURE MONOTONIC COUNTER OPERATIONS IN A PROCESSOR

BACKGROUND

Monotonic counters are used in computing systems for various security aspects. For example, such monotonic counters can be used in connection with offline movie rentals, offline game rentals, software/firmware version management and software license management, among other digital rights management (DRM) usages. Traditionally, a system processor depends on a security co-processor to access a monotonic counter. However, this reliance creates potential security issues and causes a Trusted Computing Base (TCB) to extend beyond boundaries of the system processor, which can potentially create holes for security violations.

DETAILED DESCRIPTION

Figure 1:
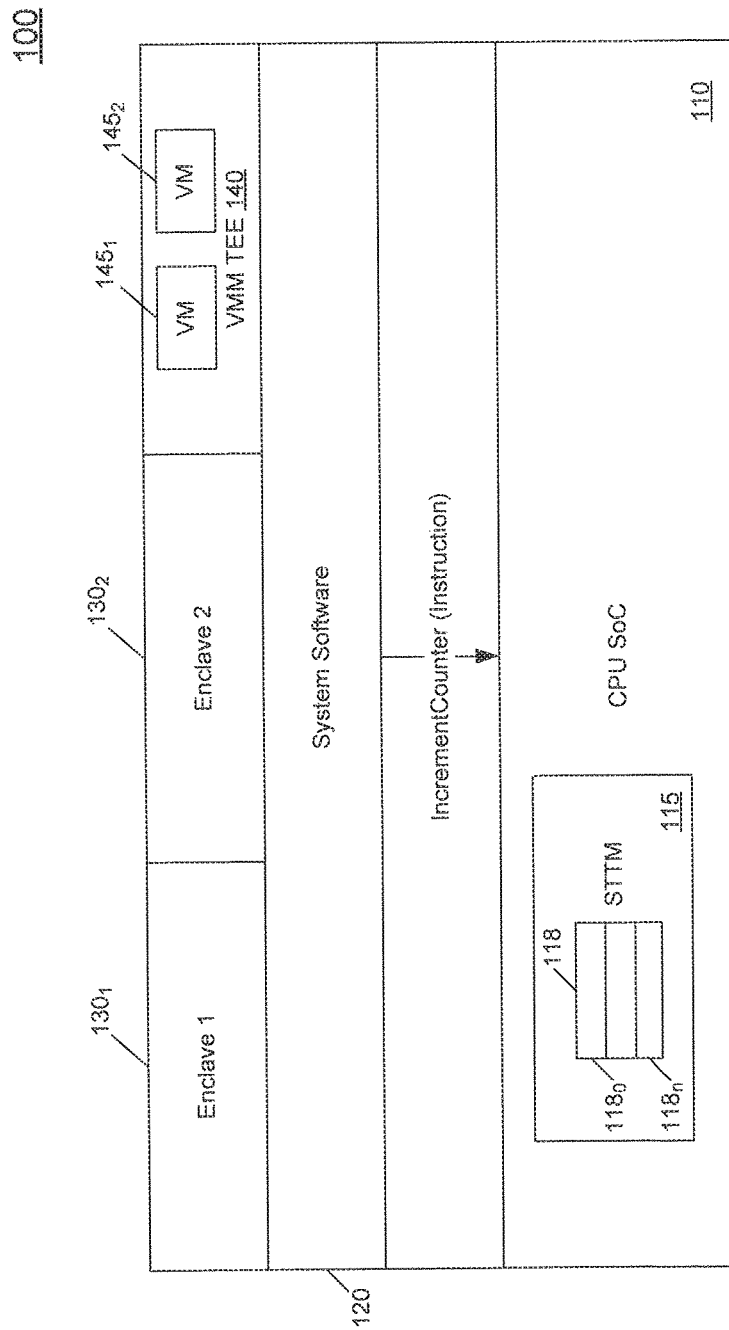
FIG. 1 is a block diagram of a computing system in accordance with an embodiment of the present invention.

In various embodiments, internal hardware circuitry of a processor such as a general-purpose processor or other system on chip (SoC) may be used to provide monotonic counters without the support of an additional co-processor. As will be described herein, in some cases one or more general-purpose processor cores (e.g., so-called x86 cores) can be used to perform monotonic counter services for agents of a system. In this way, a Trusted Computing Base (TCB) is restricted to such one or more cores, heightening security. In addition, by leveraging this processor internal circuitry, a co-processor or other external firmware is excluded from a given TCB, simplifying platform measurements used for attestation.

Although the scope of the present invention is not limited in this regard, embodiments may be leveraged by both secure and non-secure agents. As examples, circuitry for providing Intel® Software Guard Extensions (SGX) extensions to a given instruction set architecture and/or circuitry for hosting a trusted execution environment (TEE) may leverage monotonic counter capabilities of a processor as described herein.

In some cases, monotonic counter generation and control may be implemented using one or more user-level ISA instructions (which may be leveraged by both trusted and untrusted agents, in embodiments). To increase security of a solution, such monotonic counters can be maintained in a protected storage of the processor itself, such as a given on-die non-volatile storage. Or such counters can be maintained in an off-die protected storage (such as in a flash memory or hidden blocks in an embedded multimedia card (eMMC)/universal flash storage (UFS)). In a particular embodiment, the on-die storage is implemented as a spin transfer torque memory (STTM) that is formed on a single semiconductor die of the processor (along with one or more cores and additional circuitry). Such STTM is a non-volatile magnetic random access memory (MRAM) in which information is electrically read and written, and stored in the magnetic state of nanomagnets or other magnetic, particles. Of course in other embodiments a different type of on-die non-volatile memory such as a phase change memory or resistive switching memory, among others may instead be used. With a processor-internal on-die memory, a process for incrementing the monotonic counter and updating the corresponding storage is atomic and resilient to power snags.

By using an embodiment, e.g., in connection with Intel® SGX technology, a TCB is reduced to be fully implemented within a central processing unit (CPU) die. In addition, embodiments may simplify attestation mechanisms, as there is no reason to report firmware versioning information to a remote entity, since such firmware is not involved in monotonic counter operation.

In an embodiment, a monotonic counter update instruction may take the form of: EIncrementCounter, as detailed in Table 1 below, which operates on a data structure, DS_INCREMENT_COUNTER. This data structure may be resident at an address (such as an address or identifier of the data structure to he used for indexing) stored in a given register (e.g., an EAX register). More specifically, in an embodiment this data structure may have the fields as described in Table 1 below, which includes an example instruction format, instruction handling parameters and data structure for a monotonic counter in accordance with an embodiment. Of course other formats are possible.

TABLE 1

EIncrementCounter - Secure Monotonic Counter Increment

| OpCode/ Instruction | Op/En | 64-bit Mode/ 32 bit mode | CPUID Feature Flag | Description |
| --- | --- | --- | --- | --- |
| 0f XX XX EInc | EINC | Valid | SGX. Monotonic or VMX.Monotonic | This instruction is used to generate a secure monotonic counter in the privileged mode. |

Instruction Operand Encoding

| Op/En | RAX (In) Address of Data Structure | Operand 2 | Operand 3 | Implicit Register Operands (see Table |
| --- | --- | --- | --- | --- |

TABLE 1-continued

| EINC | DS_INCREMENT_COUNTER | NA | NA | below) |
|---|---|---|---|---|
| | In (Address of Data Structure DS_INCREMENT_COUNTER) | Out (Return Error Code) | | |

Description

| Field Name | Size | Type | Purpose |
|---|---|---|---|
| Identifier | 64 bits | Input | Id of the counter. The instruction can support multiple counters. |
| Current Counter Value | 64 bits | Output | Current Value of the counter. |
| RollOver | 1 bit | Output | When set, it indicates that the counter has rolled over. |

Memory Parameter Semantics
DS_INCREMENT_COUNTER

Read Access Only Permitted to Trusted Software (SGX or VM)

Return values in RAX

| | | |
|---|---|---|
| No Error | | EINC successful, there is a value available in DS_INCREMENT_COUNTER |
| COUNTER_UPDATE_FAILED | | Backup Storage Problem |

Flags affected

Sets ZF if page cannot be accepted, otherwise cleared. Clears CF, PF, AF, OF, SF
Protected Mode Exceptions

| | |
|---|---|
| #GP(0) limit. | If a memory operand effective address is outside the DS segment If a memory operand is not properly aligned. If a memory operand is locked. |
| #PF(error code) | If a page fault occurs in accessing memory operands. If a memory operand is not an EPC page. If EPC page has incorrect page type or security attributes. |

64-Bit Mode Exceptions
64-bit Mode Mode Exceptions

| | |
|---|---|
| #GP(0) | If a memory operand is non-canonical form. If a memory operand is not properly aligned. If a memory operand is locked. |
| #PF(error code) | If a page fault occurs in accessing memory operands. |

Understand that in addition to the above fields in Table 1, additional information may be associated with a monotonic counter, including status flag information. In one such example, status flags may include a rollover flag (e.g., a single bit) to indicate whether the counter has rolled over; a new counter flag (e.g., a single bit) to indicate a counter that has not been used before or where a backup storage was lost; and a corrupt flag (e.g., a single bit) to indicate a corrupted backup storage. Of course, additional flags and other status information may be present in other embodiments. Note that in different embodiments, the backup storage is SoC dependent. One implementation may include a second piece of STTM inside the SoC as a backup storage. In another example, backup storage may be off-chip, such as a Peripheral Component Interconnect Express (PCIe)-coupled NVRAM.

In an embodiment, an on-die solid state memory may be configured to be available only to the CPU cores. To this end, access to this memory may be controlled using a source address identifier (SAI) in order to make sure any non-core component, such as system agent or northbridge complex like a graphics device, is not able to access it. The content of this memory will persist across boots, to ensure correct maintenance and security of values stored in such monotonic counters. In embodiments, one or more blocks of this memory can be pre-allocated to the core for use in connection with monotonic counter activities. In some embodiments, data stored in this memory is encrypted by the cores, e.g., via microcode executing Intel® Advanced Encryption Standard New Instructions (AES-NI). A key for such encryption operations can be stored, e.g., in CPU fuses. Updates to this STTM memory can be performed atomically with the execution of an instruction, e.g., to increment the counter. The atomicity is enforced by updating the counter first, and then returning a result to a requester, instead of lazy update mechanism. As such, the instruction executes by performing a write to storage and thereafter a read from the storage.

In other cases, monotonic counters can be stored securely in stolen blocks in eMMC/UFS, such as in a given platform in which STTM is not available. Such stolen blocks are controlled (e.g., by a given microcontroller or other protection circuitry) to be only accessible to the CPU microcode. The content on these blocks is bound to a core since it is encrypted by a fuse key that is only accessible to the core(s). If the memory device is removed or repurposed, this stored data will be inaccessible and/or unusable.

Note that in different embodiments, different security levels of software or other agents may invoke the monotonic counter instructions described herein. As examples, such instructions can be invoked by any security enclave or a VMM-based TEE. As part of execution of such instructions, execution logic or other processor circuitry may perform a check to determine whether the instruction is being invoked in a permissible security mode, e.g., a secure enclave mode or unsecure mode. In this way, counters can be bound to enclave or non-enclave usages such that they can be only updated by execution within a given privilege level with which the counter is bound.

Referring now to FIG. 1, shown is a block diagram of a computing system in accordance with an embodiment of the present invention. As shown in FIG. 1, system 100 may be a portion of any type of computing system, e.g., ranging from a portable device such as a smartphone of tablet computer, to a larger device such as a desktop computer, server computer and so forth. As illustrated, computing system 100 includes hardware including a processor 110, which in an embodiment may be implemented as a CPU such as a given SoC or any other type of integrated circuit (IC). Note while a single integrated circuit is shown for ease of Illustration a given system typically includes many more such ICs, including various types of processors, memories, communication devices, sensors and so forth.

In the embodiment of FIG. 1, processor 110 includes an internal memory that may be implemented as a STTM 115. A first portion 118 of STTM 115 may be implemented as one or a set of monotonic counters to be used as described herein. In the particular illustration shown, first portion 118 includes a plurality of entries $118_0$-$118_n$, where each given entry may form a separate and independent monotonic counter. Understand that while STTM 115 is illustrated, additional circuitry on a same die (e.g., a single semiconductor die of processor 110) may include other memories such as conventional cache memories that may be formed of static random access memory (SRAM).

Figure 2:
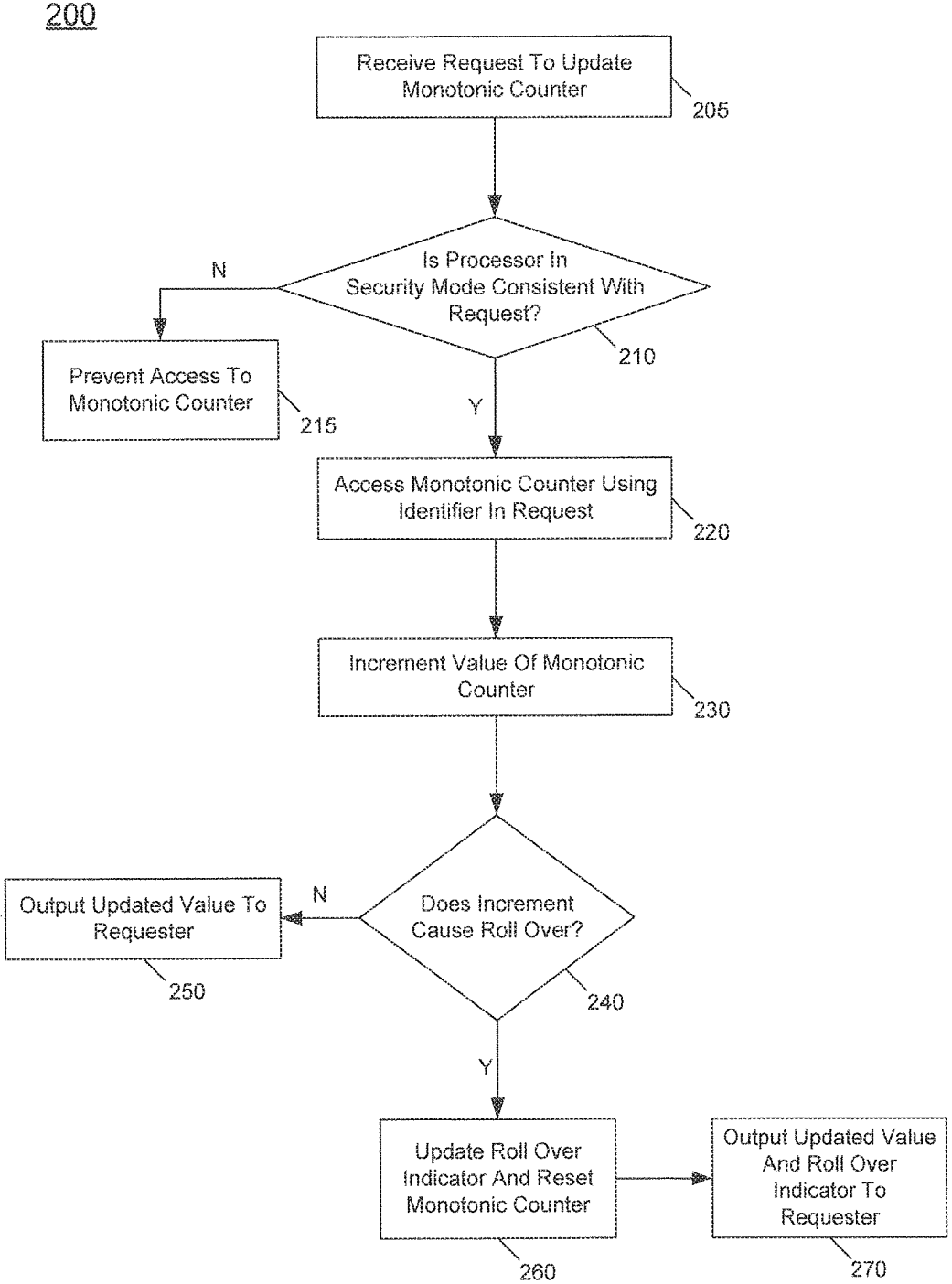
FIG. 2 is a flow diagram of a method in accordance with an embodiment of the present invention.

As further illustrated in FIG. 1, system 100 also provides an environment in which different software may execute. Specifically, a system software 120 is provided. In different embodiments, system software 120 may be implemented using one or more of an operating system (OS), a hypervisor such as a virtual machine monitor (VMM) and/or firmware. In turn, different software environments may execute on such system software 120. Specifically, multiple secure enclaves $130_1$ and $130_2$ are provided. Such secure enclaves may execute in independent trusted execution environments (TEEs), such that certain operations may occur using only protected circuitry of system 100 (such as a secure microcontroller within processor 110, as an example). Such execution may, in some embodiments, be transparent or hidden from system software 120. In particular embodiments described herein, one or more of secure enclaves 130 may leverage use of one or more of monotonic counters in entries 118 of STTM 115. To this end, during execution in a given secure enclave, certain instruction set architecture (ISA) instructions can be issued to cause operations within monotonic counters, such as read and increment operations. Still further as described herein, it is also possible to update a monotonic counter by way of a monotonic counter set instruction. In an embodiment, this instruction may enable a monotonic counter value to intemperate between multiple systems As further illustrated in FIG. 1, a particular trusted execution environment 140, namely a VMM TEE is present, on which one or more virtual machines (specifically virtual machines $145_1$, $145_2$) may execute. As with the same discussion above regarding the secure enclaves, understand that TEE 140 and/or VMs 145 also may leverage the monotonic counters present within STTM 115. Understand while shown at this high level in the embodiment of FIG. 1, many variations and alternatives are possible. Depending on implementation, untrusted software also may leverage such monotonic counters Referring now to FIG. 2, shown is a flow diagram of a method in accordance with an embodiment of the present invention. More specifically, as shown in FIG. 2, method 200 may be performed within a processor, and in sonic embodiments within a trusted execution environment of the processor, e.g., within a microcontroller, hardware security engine, control circuit, or other hardware control logic to perform monotonic counter operations as described herein, or execution in the trusted execution environment may proceed on one or more general-purpose cores of the processor. In any case, trusted execution environment may be isolated from an OS and other untrusted circuitry/code of a system. As illustrated, method 200 begins by receiving a request to update a monotonic counter (block 205). As an example, this request may be received from an application that is to consume a secure media such as protected video content, e.g., a movie, program or so forth that is provided in an encrypted format. This secure content may be protected by way of the monotonic counter, and enabled for playback only a limited number of times. Examples of an application to provide such request include a video on demand application or a content delivery application, such as Netflix™, Hulu™ or so forth, among others. A still further example is in connection with secure document management services to enable an electronic file or other document to be enabled for access (e.g., read, write or otherwise modify) a given number of times. Or in some cases, the monotonic counter associated with an electronic file may be used to provide an immutable count of the number of times a document was accessed (although no restrictions are present on number of accesses). Other use cases to associate a monotonic counter with secure content are also contemplated. Some examples are files/movies stored offline and licensed for a specific number of usages. Another example is software licensed for specific number of usages. Games can limit the user attempt at achieving specific goals and track the number of attempts locally. Location based services can use this counter to securely stored when a user has entered and exited a geo fence.

In any event, at diamond 210 it can be determined whether the processor is in a security mode consistent with the request. For example, assume that the request is received from a trusted application that executes in the TEE. Accordingly, the determination at diamond 210 determines whether the processor is in execution in the TEE. Alternately, a request may be received from an untrusted source and similarly, the determination thus may be as to whether the processor is executing in an untrusted environment. If there is a difference in mode between the security mode of the requester and the security mode of the processor, control passes to block 215 where access to the monotonic counter can be prevented. As such in this instance, no access is provided, and the requester may take appropriate action, such as preventing output or other access to the content protected by the monotonic counter.

Still with reference to FIG. 2, assuming the modes are consistent, control passes to block 220 where the monotonic counter may be accessed. More specifically, a particular monotonic counter may be accessed according to an identifier provided with the request, which may act as an index into a monotonic counter table. Next at block 230 the value of the accessed monotonic counter may be incremented, e.g., by a value of one. Of course other schemes to update the counter in another manner can occur, such as a decrement or other update to the counter.

In any event, control next passes to diamond 240 to determine whether the increment causes a rollover of the counter. If not, control passes to block 250 where the updated value can be output to the requester. Understand that this provided updated value may be used by the requester to determine whether access to the protected content is to be allowed. That is, assume that a user has purchased a license to a movie to watch it for a limited number of times, e.g., 3. Based on the monotonic counter value, which corresponds to a consumption value for the protected content, the content playback application can determine whether to allow a given playback of the movie. More specifically in this example, if the monotonic counter value is 3 or less, playback is allowed and otherwise it is prevented. Understand also that a given application may take further actions when the counter has reached a particular value, such as deletion of the secure content, communication of the maximum count to the content provider, and/or providing an indication to the user that the license has expired, among other examples.

Still referring to FIG. 2, if instead at diamond 240 it is determined that the increment in fact causes a rollover, control at block 260 updates a rollover indicator (which may be a given a rollover bit within a status field of the monotonic counter). Still further, the monotonic counter can be reset. Thereafter, control passes to block 270, where the updated value and rollover indicator may be output to the requester. As above, presumably in light of this rollover, the allotted number of views of the secure content or so forth may have been consumed, and similar operations as discussed above may occur within the requesting application. Understand while shown at this high level in the embodiment of FIG. 2, many variations and alternatives are possible.

Figure 3:
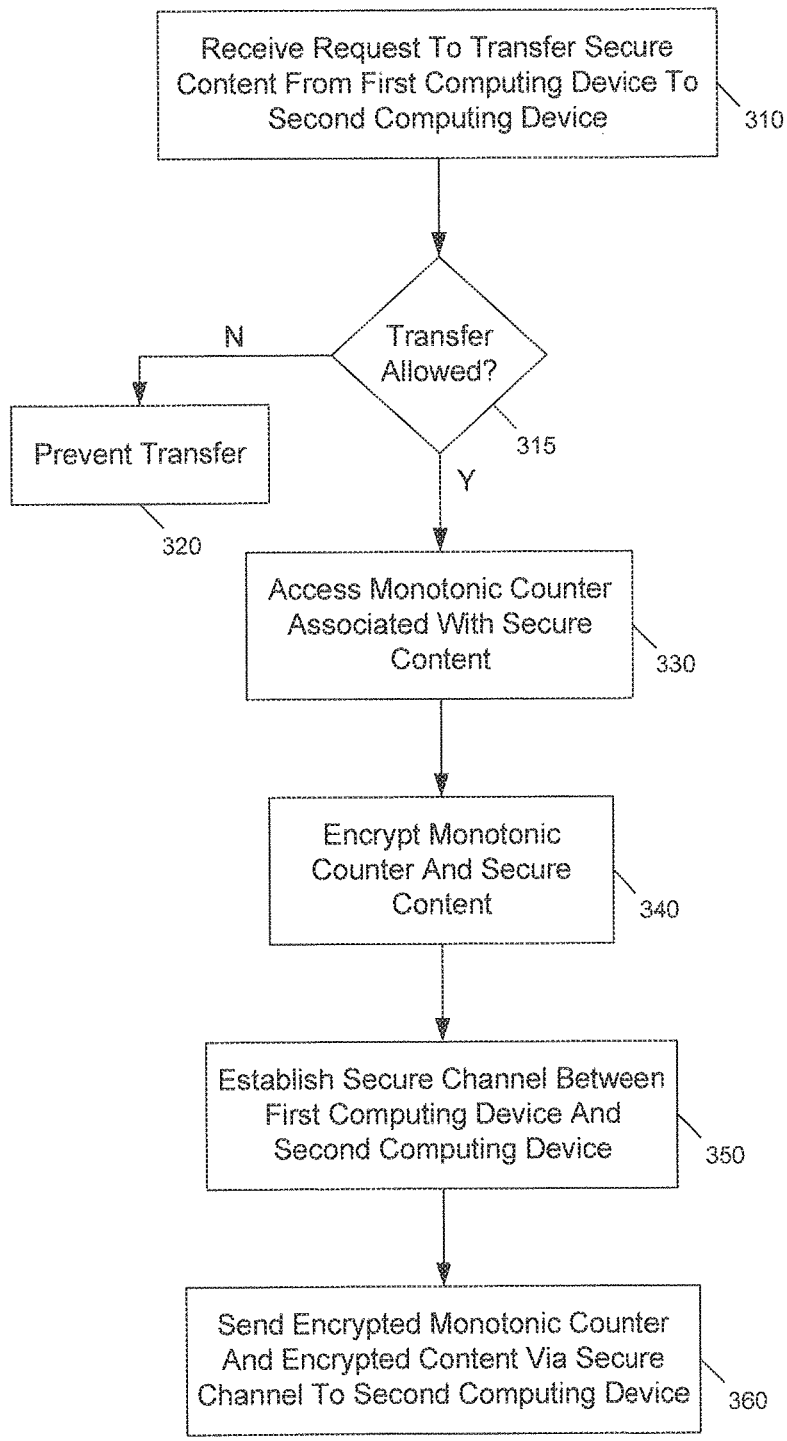
FIG. 3 is a flow diagram of a method in accordance with another embodiment of the present invention.

Referring now to FIG. 3, shown is a flow diagram of a method in accordance with another embodiment of the present invention. More specifically, method 300 shown in FIG. 3 may be performed by a processor having a monotonic counter when a request is received to transfer this monotonic counter, e.g., in connection with a transfer of secure content, from a first computing system to a second computing system. As illustrated, method 300 begins by receiving a request (block 310). More specifically, this request may be a request to transfer the secure content from the first computing device to the second computing device. For example, assume that the first computing device is a home computer system of a user in which the user has received requested content, e.g. a DRM protected movie. Assume further that the user desires (and is allowed by license) to transfer this secure content for playback on another system, such as a portable device of the user, a remote device to which the user has access or so forth.

In any case, responsive to this request received at block 310, control passes to diamond 315 to determine whether such transfer is allowed. As an example, a license associated with the secure content may be accessed and analyzed to determine whether such a transfer is allowed. If not, control passes to block 320 where the transfer is prevented. Instead if the transfer is allowed, control passes to block 330 where the monotonic counter associated with the secure content can be accessed. Note that in addition to the monotonic counter itself (namely the monotonic counter value) additional information associated with the monotonic counter, including various status fields and so forth also may be accessed. Understand that as described herein this monotonic counter may be stored, e.g., in a protected storage of the processor itself, such as STTM memory.

Control next passes to block 340 where the monotonic counter and the secure content may be encrypted. As an example, this information can be encrypted using a private key of the first computing device. In turn, on a receive end, the second computing device may use a public key of the first computing device to decrypt this information. Of course other encryption schemes such as use of a symmetric key or other pre-shared key may be used for the corresponding encryption and decryption. In other cases, understand that such encryption/decryption may be optional.

Still with reference to FIG. 3, control passes to block 350 where a secure channel may be established between the first and second computing devices. For example, a direct anonymous attestation may be performed such as an Intel® Sign and Message Authentication Code (SIGMA) and/or Intel® SIGMA CE or other manner to negotiate the secure channel using a variety of different credentials. Finally, at block 360 the encrypted monotonic counter and encrypted content may be sent via the secure channel to the second computing device. At this point, both the secure content and monotonic counter are effectively removed from the first computing system and no longer accessible therein. Understand while shown at this high level in the embodiment of FIG. 3, many variations and alternatives are possible.

Figure 4:
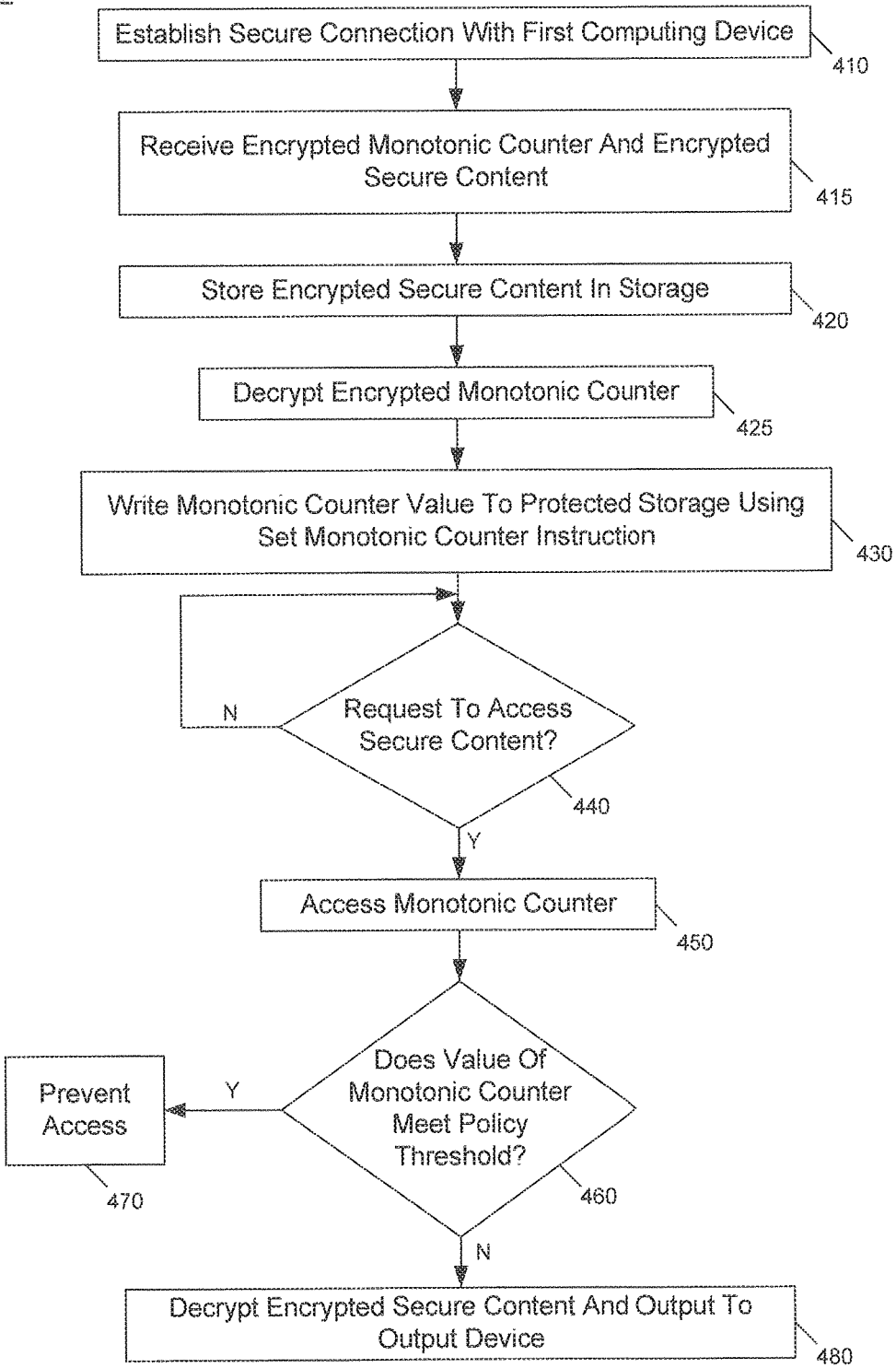
FIG. 4 is a flow diagram of a method in accordance with yet another embodiment of the present invention.

Referring now to FIG. 4, shown is a flow diagram of a method in accordance with yet another embodiment of the present invention. More specifically, method 400 shown in FIG. 4 may be performed by a processor within the second computing device that receives encrypted information (namely a monotonic counter and associated secure content) from the first computing device.

As illustrated, method 400 begins by establishing a secure connection with the first computing device (block 410), as described above. Thereafter block 415 the encrypted monotonic counter and encrypted secure content is received. At block 420 the encrypted secure content may be stored in a given storage of the second computing device. As an example, given that this information is encrypted, it may be stored in an unprotected mass storage of the second computing device, such as a disk drive, solid state drive, flash memory or so forth. Of course, storage in a protected storage also is possible.

Still with reference to FIG. 4 at block 425 the encrypted monotonic counter may be decrypted. Understand that this decryption operation may be performed within a TEE of the second computing device. And as described, herein in some cases a given public key of the first computing device can be used to perform this decryption. When the monotonic counter is decrypted, at block 430 its value can be written to a protected storage. More specifically, in an embodiment this monotonic counter value (and associated status information) may be provided for storage in a STTM of the processor of the second computing device. In an embodiment, a different user-level monotonic counter instruction, namely a set monotonic counter instruction, can be used to set the value. Understand that this set instruction causes the received monotonic counter value (which may be at the value as sent from the first computing device) to be stored in the STTM or other protected storage.

At this point, the second computing device is ready to perform operations using this monotonic counter. More specifically, at diamond 440 it can be determined whether a request to access the secure content has been received, if so, at block 450 the monotonic counter may be accessed (assuming that the request is received while the processor is in an appropriate security mode) as described above. Thereafter, at diamond 460 it is determined whether the value of the monotonic counter meets a policy threshold. Assume for purposes of discussion that this policy threshold allows for 3 views of the secure content. In this case at diamond 460 it can be determined whether the consumption value of the monotonic counter meets its policy threshold of 3 views. If so, control passes to block 470 where access to the secure content is prevented. Of course depending upon a given security policy other operations also are possible, such as providing art indication to the user that the license has expired, deleting the selected content or so forth.

Still with reference to FIG. 4, if instead it is determined at diamond 460 that the value of the monotonic counter does not meet the policy threshold, control passes to block 480 where the encrypted secure content can be decrypted and output to a given output device, e.g., display of the second computing system. Understand while shown at this high level in the embodiment of FIG. 4, many variations and alternatives are possible.

Embodiments thus provide user-level ISA instructions for generating and controlling monotonic counters. Embodiments further enable processors or other SoCs to provide convergence and integration of functionality, including monotonic counter generation and maintenance within a single integrated circuit, providing enhanced computing capability, reduced complexity and reducing dependency on co-processors.

Figure 5:
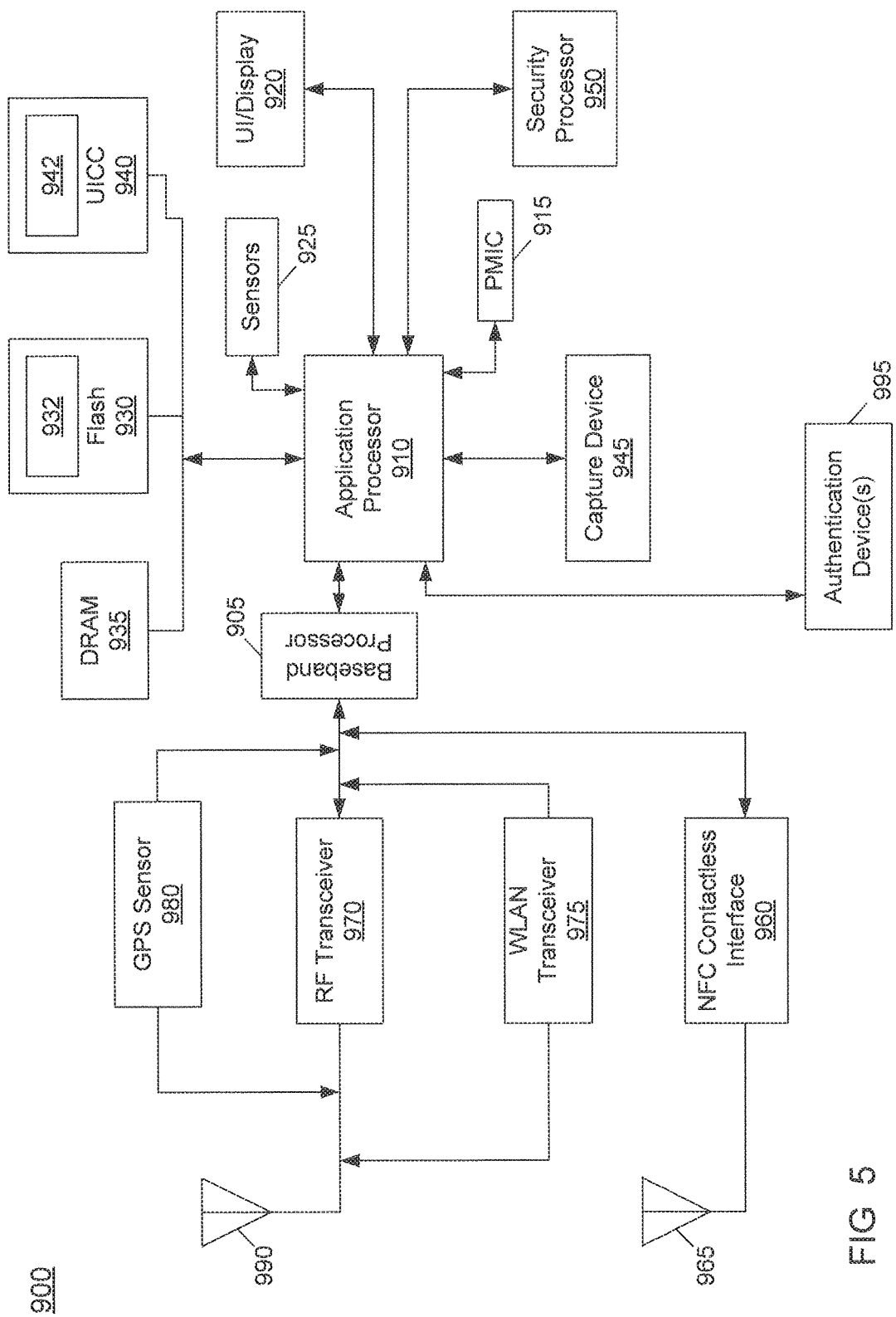
FIG. 5 is a block diagram of an example system with which embodiments can be used.

Referring now to FIG. 5, shown is a block diagram of an example system with which embodiments can be used. In an example, system 900 may be a smartphone or other wireless communicator or any other Internet of Things (IoT) device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as content playback applications, which may protect content by DRM technologies. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 932 in which secrets and other sensitive information may be stored. As further seen, application processor 910 also couples to a capture device 945 such as one or more image capture devices that can record video and/or still images.

Still referring to FIG. 5, a universal integrated circuit card (UICC) 940 comprises a subscriber identity module, which in some embodiments includes a secure storage 942 to store secure user information. System 900 may further include a security processor 950 that may that may implement a TEE, and which may couple to application processor 910. Furthermore, application processor 910 may implement a secure mode of operation, such as Intel® SGX extensions to a given instruction set architecture, and circuitry for hosting of a TEE. Security processor 950 and/or application processor 910 may be configured to perform the monotonic counter operations as described herein, to enable system 900 to control secure content access based at least in part on an internally generated and updated monotonic counter. A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 5, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more IoT networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein when context information is to be used in a pairing process. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 6:
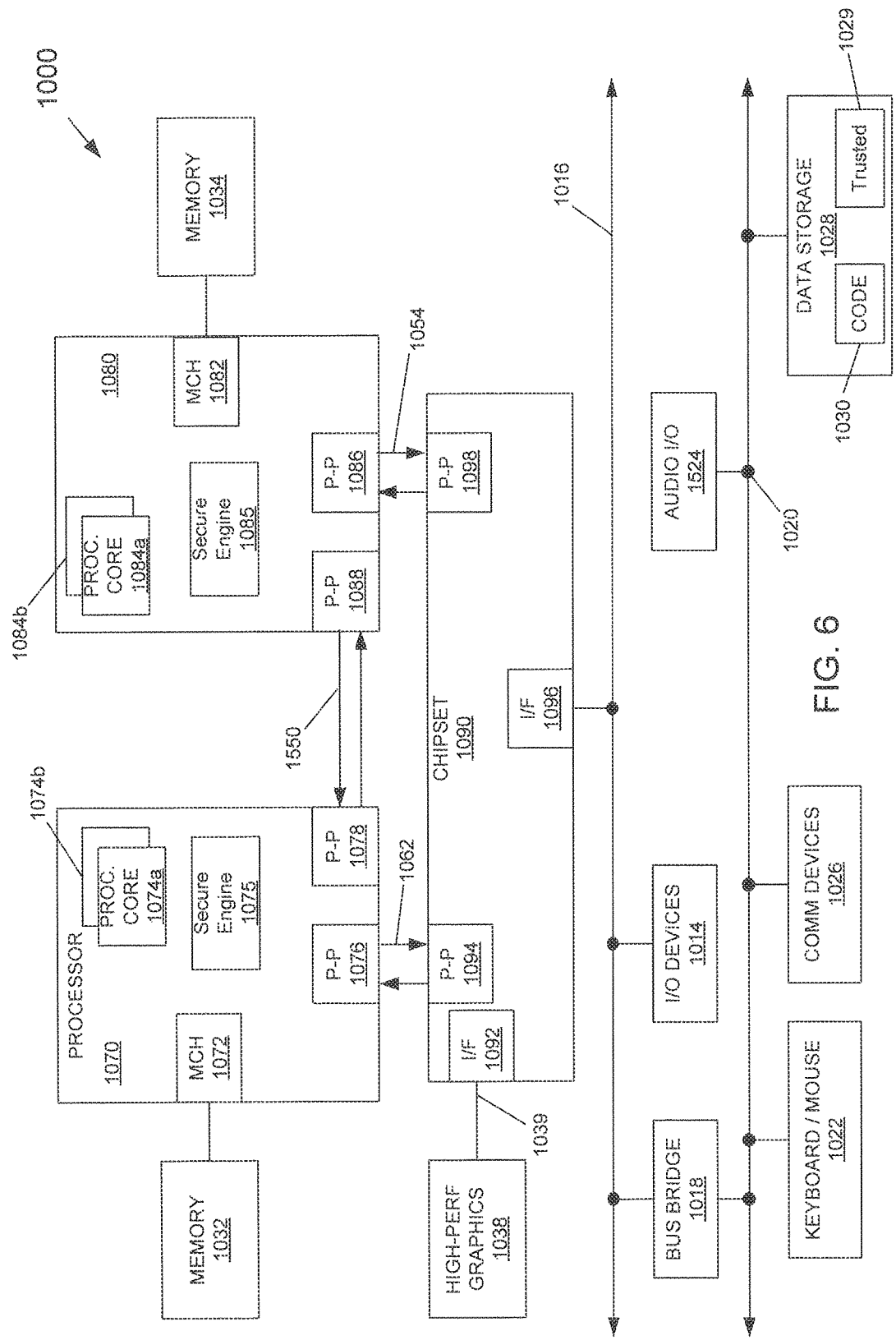
FIG. 6 is a block diagram of a system in accordance with another embodiment of the present invention.

Referring now to FIG. 6, shown is a block diagram of a system in accordance with another embodiment of the present invention. As shown in FIG. 6, multiprocessor system 1000 is a point-to-point interconnect system such as a server system, and includes a first processor 1070 and a second processor 1080 coupled via a point-to-point interconnect 1050. An embodiment, system 1000 may be a client system that can seek to access and output secure content. As shown in FIG. 6, each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085 to perform monotonic counter operations as described herein, among other operations.

Still referring to FIG. 6, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 6, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 6, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 6, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected (such as protected content). Further, an audio I/O 1024 may be coupled to second bus 1020.

The following Examples pertain to further embodiments.

In Example 1, an apparatus includes: at least one core to execute instructions, the at least one core formed on a semiconductor die; a first memory formed on the semiconductor die, the first memory comprising a non-volatile random access memory, the first memory to store a first entry to be a monotonic counter; the first entry including a value field and a status field; and a control circuit, where the control circuit is to enable access to the first entry if the apparatus is in a secure mode and otherwise prevent the access to the first entry.

In Example 2, the control circuit is to update a value stored in the value field responsive to a first user-level monotonic counter instruction.

In Example 3, the status field comprises a rollover indicator to indicate whether the value stored in the value field has rolled over and a second indicator to indicate whether a backup storage for the monotonic counter is corrupt.

In Example 4, the control circuit of one or more of the above Examples is to cause the value field to be set to a first value received from a second computing system responsive to a second user-level monotonic counter instruction, where the first value comprises a consumption level for a secure content.

In Example 5, the apparatus is to prevent access to the secure content if the first value at least meets a policy threshold.

In Example 6, the first entry further comprises an address field, where the control circuit is to access the first entry when the first user-level monotonic counter instruction includes an identifier corresponding to an address stored in the address field.

In Example 7, the control circuit comprises a policy manager, the policy manager to enable access to a secure content if a value stored in the value field is less than a policy threshold, and otherwise to prevent the access to the secure content.

In Example 8, the non-volatile random access memory comprises a spin torque transfer memory.

In Example 9, the apparatus is to execute in a trusted execution environment, and a trusted computing base including the monotonic counter is wholly included in the semiconductor die.

In Example 10, the at least one core comprises the control circuit.

In Example 11, a method includes: responsive to receipt of a request from a requester to update a monotonic counter of a processor, determining whether the processor is in a first security mode; when it is determined that the processor is in the first security mode, accessing, via logic of the processor, the monotonic counter using an identifier associated with the request; incrementing, via the logic, a value of the monotonic counter; and outputting, via the logic, the value of the monotonic counter to the requester.

In Example 12, the method further comprises preventing the access to the monotonic counter when it is determined that the processor is not in the first security mode, where the requester is an agent to execute in the first security mode.

In Example 13, the method further comprises: determining, after the increment to the value of the monotonic counter, whether the value of the monotonic counter has rolled over; and responsive to the rollover of the value of the monotonic counter, setting a rollover indicator in a status field associated with the monotonic counter.

In Example 14, the method further comprises enabling access to secure content if the value of the monotonic counter has not met a policy threshold, and otherwise preventing the access to the secure content, the monotonic counter associated with the secure content.

In Example 15, the method further comprises encrypting the monotonic counter and sending the encrypted monotonic counter to a second computing system, responsive to a request to provide secure content to the second computing system, the monotonic counter associated with the secure content.

In Example 16, the method further comprises enabling the secure content and the encrypted Monotonic counter to be sent to the second computing system, based at least in part on a license associated with the secure content.

In another Example, a computer readable medium including instructions is to perform the method of any of the above Examples.

In a further Example, a computer readable medium including data is to be used by at least one machine to fabricate at least one integrated circuit to perform the method of any one of the above Examples.

In a still further Example, an apparatus comprises means for performing the method of any one of the above Examples.

In Example 17, a system includes: a processor having: at least one core to execute instructions; at least one cache memory; a non-volatile random access memory to store a table of monotonic counters, where the monotonic counters include an identifier field, a value field and a status field; and a logic, responsive to a request by a first application, to atomically update a first monotonic counter of the table of monotonic counters and provide an updated value of the first monotonic counter to the first application, where the first application is to allow secure content associated with the first monotonic counter to be output via a display when the updated value of the first monotonic counter is less than a threshold. The system may further include a storage to store the secure content and the display to output the secure content.

In Example 18, the non-volatile random access memory comprises a spin transfer torque memory and the at least one core comprises the logic.

In Example 19, the threshold is based on a license associated with the secure content.

In Example 20, the logic is to atomically update the first monotonic counter and provide the updated value to the first application when the first application is of a first privilege level and the at least one core is in the first privilege level.

In Example 21, an apparatus includes: means for executing instructions and formed on a semiconductor die; a first memory means formed on the semiconductor die, the first memory means comprising a non-volatile random access memory means, the first memory means for storing a first entry to be a monotonic counter, the first entry including a value field and a status field; and control means for enabling access to the first entry if the apparatus is in a secure mode and otherwise preventing the access to the first entry.

In Example 22, the control means is to update a value stored in the value field responsive to a first user-level monotonic counter instruction.

In Example 23, the status field comprises a rollover indicator to indicate whether the value stored in the value field has rolled over and a second indicator to indicate whether a backup storage means for the monotonic counter is corrupt.

in Example 24, the control means of one or more of the above Examples is to cause the value field to be set to a first value received from a second computing system responsive to a second user-level monotonic counter instruction, where the first value comprises a consumption level for a secure content.

Understand that various combinations of the above Examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory computer readable storage medium comprising instructions that when executed enable a system to:
   responsive to receipt of a request from a requester to update a monotonic counter of a processor, determine whether the processor is in a first security mode;
   when it is determined that the processor is in the first security mode, access, via logic of the processor, the monotonic counter using an identifier associated with the request, the logic to index into a table of monotonic counters with the identifier to access the monotonic counter;
   increment, via the logic, a value of the monotonic counter;
   output, via the logic, the value of the monotonic counter to the requester; and
   encrypt the monotonic counter and send the encrypted monotonic counter to a second computing system, responsive to a request to provide secure content to the second computing system, the monotonic counter associated with the secure content.

2. The at least one non-transitory computer readable storage medium of claim 1, further comprising instructions that when executed enable the system to prevent the access to the monotonic counter when it is determined that the processor is not in the first security mode, wherein the requester is an agent to execute in the first security mode.

3. The at least one non-transitory computer readable storage medium of claim 1, further comprising instructions that when executed enable the system to:
   determine, after the increment to the value of the monotonic counter, whether the value of the monotonic counter has rolled over; and
   responsive to the rollover of the value of the monotonic counter, set a rollover indicator in a status field included in the monotonic counter.

4. The at least one non-transitory computer readable storage medium of claim 1, further comprising instructions that when executed enable access to the secure content if the value of the monotonic counter has not met a policy threshold, and otherwise to prevent the access to the secure content.

5. The at least one non-transitory computer readable storage medium of claim 1, further comprising instructions that when executed enable the secure content and the encrypted monotonic counter to be sent to the second computing system, based at least in part on a license associated with the secure content.

6. The at least one non-transitory computer readable storage medium of claim 1, wherein the request comprises an instruction set architecture instruction.

7. At least one non-transitory computer readable storage medium comprising instructions that when executed enable a system to:
   responsive to receipt of a request from a requester to update a monotonic counter of a processor, determine whether the processor is in a first security mode;
   when it is determined that the processor is in the first security mode, access, via logic of the processor, the monotonic counter using an identifier associated with the request, the logic to index into a table of monotonic counters with the identifier to access the monotonic counter;
   increment, via the logic, a value of the monotonic counter;

output, via the logic, the value of the monotonic counter to the requester; and
update the monotonic counter when a user enters or exits a geo fence.

8. A method comprising:

responsive to receipt of a request from a requester to update a monotonic counter of a processor, determining whether the processor is in a first security mode;

when it is determined that the processor is in the first security mode, accessing, via logic of the processor, the monotonic counter using an identifier associated with the request, the logic to index into a table of monotonic counters with the identifier to access the monotonic counter;

incrementing, via the logic, a value of the monotonic counter;

outputting, via the logic, the value of the monotonic counter to the requester;

accessing secure content if the value of the monotonic counter has not met a policy threshold, and otherwise preventing the access to the secure content, the monotonic counter associated with the secure content; and encrypting the monotonic counter and sending the encrypted monotonic counter to a second computing system, responsive to a request to provide the secure content to the second computing system.

9. The method of claim 8, further comprising preventing the access to the monotonic counter when it is determined that the processor is not in the first security mode, wherein the requester is an agent to execute in the first security mode.

10. The method of claim 8, further comprising:

determining, after the increment to the value of the monotonic counter, whether the value of the monotonic counter has rolled over; and responsive to the rollover of the value of the monotonic counter, setting a rollover indicator in a status field included in the monotonic counter.

11. The method of claim 8, further comprising enabling the secure content and the encrypted monotonic counter to be sent to the second computing system, based at least in part on a license associated with the secure content.

12. The at least one non-transitory computer readable storage medium of claim 7, wherein the request comprises an instruction set architecture instruction.

* * * * *